W. A. RHODES.
TESTING APPARATUS FOR MESSAGE REGISTERS.
APPLICATION FILED JUNE 27, 1919.

1,379,650.

Patented May 31, 1921.
3 SHEETS—SHEET 1.

INVENTOR.
W. A. Rhodes
BY
ATTORNEY

W. A. RHODES.
TESTING APPARATUS FOR MESSAGE REGISTERS.
APPLICATION FILED JUNE 27, 1919.

1,379,650.

Patented May 31, 1921.
3 SHEETS—SHEET 2.

INVENTOR.
W. A. Rhodes
BY
ATTORNEY

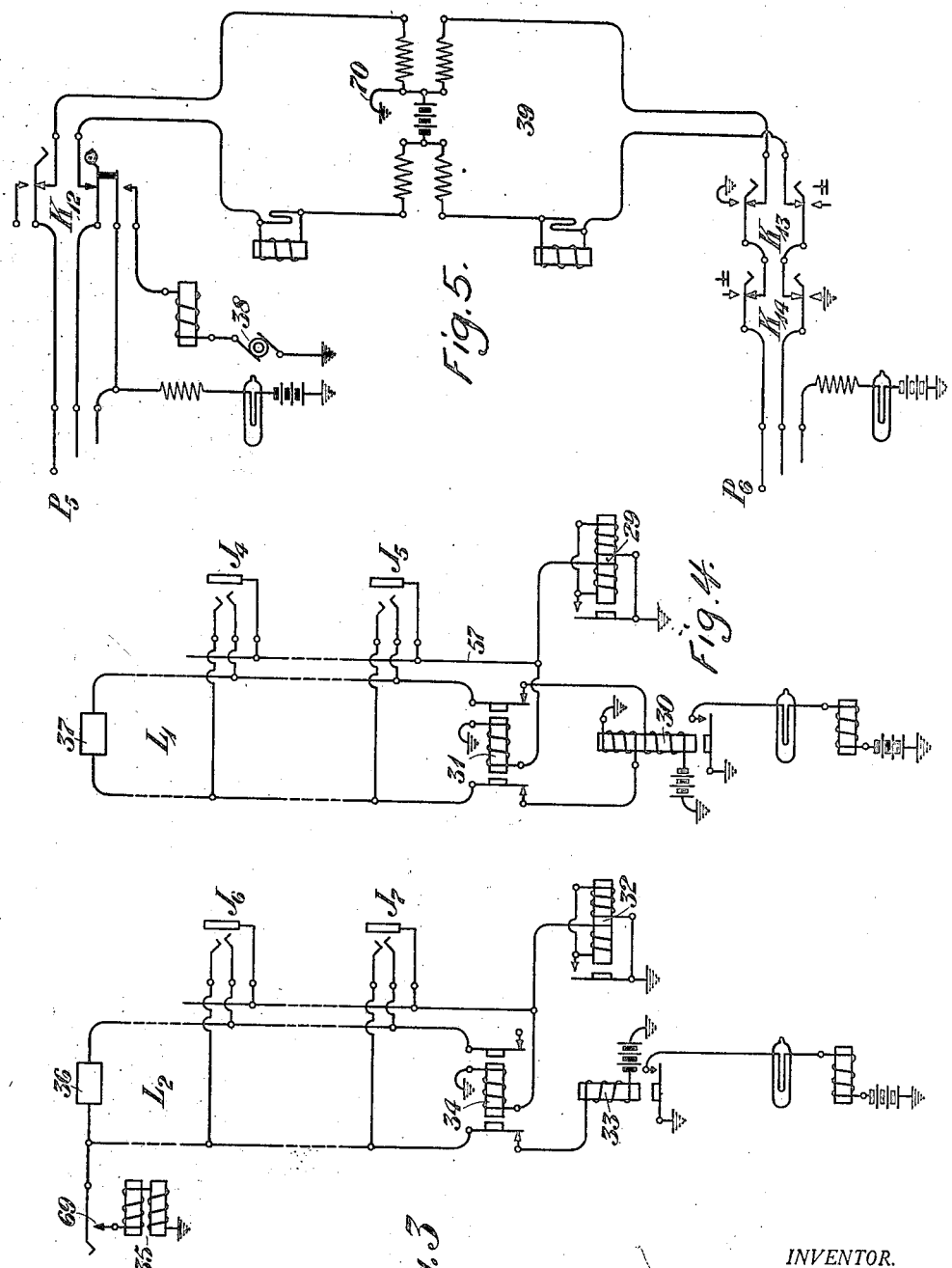

UNITED STATES PATENT OFFICE.

WILLIAM A. RHODES, OF NEW YORK, N. Y., ASSIGNOR TO AMERICAN TELEPHONE AND TELEGRAPH COMPANY, A CORPORATION OF NEW YORK.

TESTING APPARATUS FOR MESSAGE-REGISTERS.

1,379,650.  Specification of Letters Patent.  Patented May 31, 1921.

Application filed June 27, 1919. Serial No. 307,073.

*To all whom it may concern:*

Be it known that I, WILLIAM A. RHODES, residing at New York, in the county of New York and State of New York, have invented certain Improvements in Testing Apparatus for Message-Registers, of which the following is a specification.

This invention relates to telephone systems and more particularly to arrangements for testing apparatus associated with central offices and switchboards in such systems.

It is customary to associate with a subscriber's line message register apparatus, which will operate when the operator depresses a key or button at her position and thus afford a means for recording the number of calls for which a subscriber is to be charged. In general such message register apparatus consists of a plurality of disks numbered on their outer surfaces and mounted on a common axis, these disks controlling the operation of each other in sequence. The operation of the disks is controlled by a ratchet wheel driven through a pawl attached to the armature of an electro-magnet. As the proper billing of the subscriber depends on the proper operation of such message register apparatus it is desirable to test such apparatus at frequent intervals. Such testing might be accomplished manually by depressing the key at the operator's position, but such a practice would involve an undue amount of time. Furthermore in order to be sure of the satisfactory operation of the message register apparatus it is desirable to test the apparatus for one hundred operations, for within such a range any defects in the apparatus which are not apparent in billing the subscriber will be detected.

Accordingly it is a general purpose of this invention to provide a set for testing message registers which will operate automatically, which will test the registers for a desired number of operations, and which will accomplish such a result in a short space of time. Other and further purposes and features of the invention will be clear from the detailed description of the invention which follows.

Figure 1:
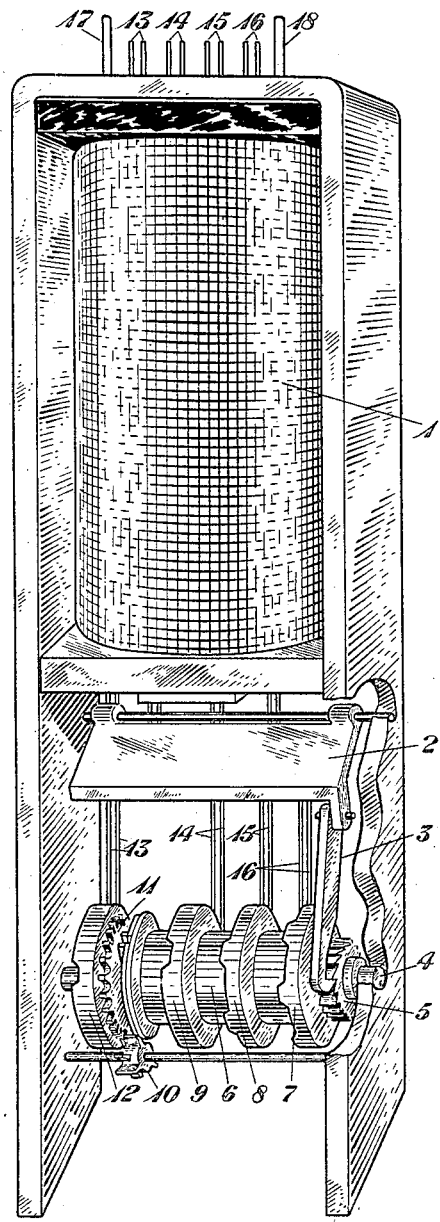
Figure 2:
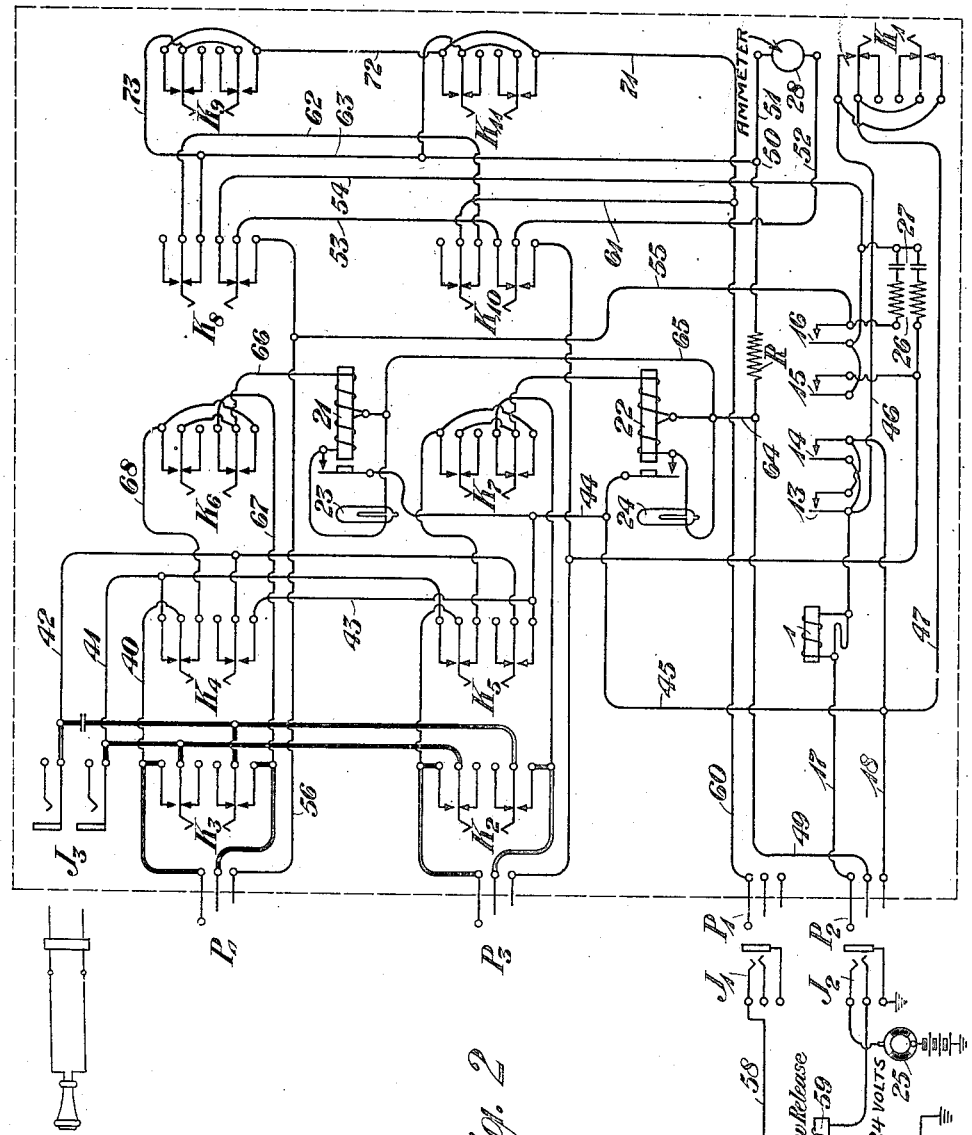

The invention may be more fully understood from the following description when taken in connection with the accompanying drawing, in the Figures 1, 2, 3, 4 and 5 of which is illustrated an arrangement embodying a preferred form of the invention. In Fig. 1 is shown an interrupter included in the testing set which controls the operation of the set so that a message register may be tested for a desired number of operations, such as one hundred operations. In Fig. 2 is shown a circuit diagram of the testing set and in Figs. 3, 4 and 5 are shown subscriber's lines with which are associated message registers to be tested and also a cord circuit.

The winding of a magnet 1 in the test interrupter illustrated in Fig. 1 is associated by means of conductors 17 and 18 with the peremptory disconnect apparatus at the switchboard, which apparatus is a means for interrupting 24-volt battery four times a second. This magnet winding is connected through two contacts which are open until it starts operating and which do not again open together until a predetermined number of operations have been completed, at which time these contacts will open and stop the operation of the apparatus. These two normally open contacts are placed on pairs of springs 13 and 14 and are operated by cams 12 and 9 respectively. These springs bear upon the cams on the underside of the register and their points of contact with the cams are not shown. Cam 9 is mounted on a cylinder 6 which is attached to a ratchet wheel 5 which in turn is driven by the pawl 3 attached to the armature 2 of electro-magnet 1. Cam 12 is driven by means of pinion 10 which is so connected through gearing 11 that cam 12 rotates once for twenty revolutions of cam 9. The ratchet wheel 5 is provided with twenty teeth. Accordingly it will be seen that the contacts on springs 13 and 14 will be both opened together only once during four hundred operations of armature 2. Accordingly when the testing set has been started in operation and the contact on either of springs 14 or 13 closed the interrupter will continue to operate for four hundred operations of armature 2, at which point both contacts on springs 14 and 13 will be opened and the circuit including winding of magnet 1 broken and the apparatus will stop operating. Mounted on cylinder 6 are the cams 7 and 8, each of which has five projections. These cams control contacts on the springs 15 and 16, which contacts in turn control circuits which are associated with the message registers to be tested. Two cams are provided, the projections on each being staggered, as it may be desirable to test two message registers at the same time. As each of the cams 8 and 7 has five projections and as ratchet wheel 5 has twenty teeth, it will be seen that each of these cams will close the contacts on springs 15 and 16, respectively, once during every four operations of armature 2. Accordingly when the armature 2 has operated four hundred times the contacts on springs 15 and 16 will each have been closed one hundred times and the message registers will have been tested for one hundred operations.

In Fig. 2 is illustrated a circuit diagram of the testing set in which the interrupter apparatus of Fig. 1 is included. The electromagnet 1 of the interrupter is shown associated with the plug $P_2$ by means of conductors 17 and 18. Associated therewith are the previously described spring contacts 13, 14, 15 and 16. Associated with electro-magnet 1 is the key $K_1$ whereby the apparatus may be started in operation. The resistances 26 and condensers 27 are provided to prevent sparking at contacts 15 and 16. The testing set is provided with the plugs $P_1$, $P_2$, $P_3$ and $P_4$. The plugs $P_1$ and $P_2$ are adapted to coöperate with jacks $J_1$ and $J_2$ respectively. The jack $J_2$ is associated with a peremptory disconnect interrupter 25, which is a means for interrupting 24 volt battery four times a second, and which operates the electro-magnet 1. The jack $J_1$ is associated with a source of 39 volt current which serves to operate the message registers to be tested. The plugs $P_3$ and $P_4$ are adapted to be inserted in jacks of lines with which are associated message registers to be tested. Associated with plugs $P_3$ and $P_4$ are the jacks $J_3$ with which a telephone receiver may be associated with the testing set. Associated with plug $P_4$ are the keys $K_3$, $K_4$, $K_6$, $K_8$, and $K_9$. The key $K_3$ is a listening key and serves to connect the telephone receiver associated with jacks $J_3$ to the plug $P_4$, if it is desired to listen in on a line under test. The key $K_4$ is a busy test key and is operated before the plug $P_4$ is inserted in a line jack in order that the usual busy test may be made on the line. Associated with the relay transfer key $K_6$ is the relay 21 and the signal lamp 23. The key $K_6$ connects relay 21 to either the tip or ring contact of plug $P_4$, this operation depending on whether the message register to be tested is associated with an ordinary subscriber's line or with a line equipped with a prepayment coin box or a substation message register as will be pointed out later. Whenever a subscriber on a line under test attempts to make a call or if an operator should plug into such a line the relay 21 will respond and cause the signal lamp 23 to light, thereby notifying the test man to remove the testing set from the line. The keys $K_8$ and $K_9$ are for testing a message register for a single operation and more particularly for determining whether the message register will operate with a current of the proper voltage. The ordinary current applied to the sleeve of an operator's cord circuit is of approximately 24 volts through a lamp and a resistance as indicated in the cord 39 of Fig. 3. When such a cord is connected to a subscriber's line jack this voltage is not enough to cause the message register to operate. However when the message register key of the cord circuit is depressed a current of approximately 39 volts is applied to the sleeve circuit in parallel with the 24 volts. This current is sufficient to operate the message register apparatus. After the message register has operated and the message register key been released the 24-volt battery applied to the sleeve circuit suffices to maintain the apparatus in an operated condition. With this arrangement the message register will not operate more than once even though the operator might depress the register key more than once. Accordingly by operating key $K_8$ a battery of 24 volts may be applied to the sleeve of plug $P_4$ through a resistance which is the equivalent of the cord sleeve lamp and resistance; and by operating key $K_9$ a battery of 39 volts may be applied thereto. The key $K_9$ may then be released and the key $K_8$ allowed to remain thrown. If the message register under test then remains operated it will be operating properly. Associated with keys $K_8$ and $K_9$ is an ammeter 28 whereby the operating currents may be observed. Associated with plug $P_3$ are the keys $K_2$, $K_5$, $K_7$, $K_{10}$, and $K_{11}$ which are similar in purpose and operation to the keys $K_3$, $K_4$, $K_6$, $K_8$ and $K_9$ respectively. Associated with key $K_7$ is a relay 22 and a signal lamp 24 which are similar in operation to relay 21 and signal lamp 23 respectively.

In Figs. 3 and 4 are illustrated two types of subscriber's lines, such as $L_1$ and $L_2$, with which are associated message registers which it may be desired to test. The line $L_1$ of Fig. 4 is the ordinary type of subscriber's line and terminates at the substation 37 and at the multiple jacks $J_4$ and $J_5$. Associated with line $L_1$ is the usual cut-off relay 31, the line relay 30, and the message register apparatus 29. It is pointed out that in the ordinary type of subscriber's line, such as $L_1$, that battery from the line relay is applied to the ring side of the line. The line $L_2$ of Fig. 3 is a type of line equipped with a prepayment coin box or substation message register, such as 35, whereby the dropping of the coin in the coin box or the operation of a push button at the substation closes a contact and circuit controlling the line relay 33. In this type of line battery associated with the line relay is applied to the tip side of the line. Associated with line $L_2$ is the substation 36, multiple jacks $J_6$ and $J_7$, the cut-off relay 34 and the message register apparatus 32. In Fig. 5 an operator's cord circuit 39 is shown whereby connections may be made with the lines $L_1$ and $L_2$. The cord 39 terminates in plugs $P_5$ and $P_6$. Associated with plug $P_5$ is the message register key $K_{12}$ and associated with plug $P_6$ are the ringing keys $K_{13}$ and $K_{14}$ whereby the operator may ring over either side of the line.

The operation of the invention is as follows:

If it is desired to test the operation of the message register apparatus 29 associated with the subscriber's line $L_1$, the plugs $P_1$ and $P_2$ will be inserted in the jacks $J_1$ and $J_2$, respectively, a telephone receiver will be connected with jacks $J_3$ and the busy test key $K_4$ will be operated. The test man will now make the usual type of busy test on the line $L_1$ with the plug $P_4$. If the line $L_1$ is in a busy condition, current will be applied through the telephone receiver associated with the jacks $J_3$ over the following circuit: from the tip conductor of line $L_1$, tip contacts of jack $J_5$ and plug $P_4$, conductor 40, upper make contact of key $K_4$, conductor 41, through the telephone receiver, conductor 42, lower make contact of key $K_4$, conductors 43, 44, 45 and 18, sleeve contacts of plug $P_2$ and jack $J_2$ to ground. If the line $L_1$ is not found to be busy on being tested, the key $K_4$ will be restored to normal, and the plug $P_4$ will remain inserted in one of the multiple jacks, such as the jack $J_5$. The key $K_1$ will now be operated and the following circuit closed: from ground and battery, peremptory disconnect interrupter 25, tip contacts of jack $J_2$ and plug $P_2$, conductor 17, winding of electro-magnet 1, conductor 46, make contacts with key $K_1$, conductor 47, conductor 18, sleeve contacts of plug $P_2$ and jack $J_2$ to ground. The closing of this circuit will intermittently operate the electro-magnet 1. As has been formerly pointed out, the armature of magnet 1 and the cam mechanism already described and illustrated in Fig. 1 controls the operation of the spring contacts 13, 14, 15 and 16. Accordingly upon the closing of this circuit and the operation of magnet 1, the contact 13 and subsequently 14 will be closed and will not open again together until the armature of magnet 1 has operated 400 times, at which time both contacts 13 and 14 will be opened and the apparatus will stop operating. As has already been pointed out, while the armature of relay 1 is operating 400 times, the spring contacts 15 and 16 will each be closed 100 times. Accordingly after the operation has been started by the throwing of key $K_1$ and contact 14 has been closed, the key $K_1$ may be restored to normal, and the previously traced circuit about the winding of magnet 1 will now be completed as follows: from ground and battery, peremptory disconnect interrupter 25, tip contacts of jack $J_2$ and plug $P_2$, conductor 17, winding of relay 1, contact 13, conductor 18, sleeve contacts of plug $P_2$ and jack $J_2$, to ground. When the plug $P_4$ is connected to jack $J_5$ and when the key $K_1$ has been operated and the test interrupter started, a 24 volt battery and a 39 volt battery will be intermittently applied through the spring contacts of the test interrupter to the sleeve circuit of plug $P_4$ and thence to the message register apparatus 29 associated with line $L_1$ as follows: 24 volt battery is applied to the message register apparatus over the following circuit: from ground and battery, winding of relay 59, ring contacts of jack $J_2$ and plug $P_2$, conductor 49, through a resistance to junction point 50, from junction point 50 over conductor 51, ammeter 28, conductor 52, lower normal contact of key $K_{10}$, conductor 53, lower normal contact of key $K_8$, conductor 54, spring contact 16, conductor 55, sleeve conductor 56, sleeve contacts of plug $P_4$ and jack $J_5$, conductor 57, winding of message register apparatus 29, to ground. The closing of this circuit will operate the relay 59 which will connect a source 48 of 39-volt current to the message register apparatus 29 as follows: from source 48, armature and contact of relay 59, conductor 58, contact of jack $J_1$ and plug $P_1$, conductor 60, conductor 61, upper normal contact of key $K_{10}$, conductor 62, upper normal contact of key $K_8$, conductor 63 to junction point 50; from junction point 50 to 39-volt battery will be applied over the same circuit as the 24-volt battery which has been previously described. This current from the 39-volt battery will operate the message register apparatus 29 and as the circuit over which this current is applied included the spring contact 16 which is intermittently opening and closing, the message register apparatus will accordingly be operated 100 times. In a similar manner the current will be applied from the 24-volt and the 39-volt sources over spring contact 15 to the sleeve circuit of plug $P_3$, so that if the plug $P_3$ is associated with the jack of another line, the message register apparatus associated with such line may be tested at the same time that the message register apparatus 29 is being tested.

If, while the message register apparatus 29 associated with line $L_1$, it being tested as described, the subscriber at substation 37 should attempt to make a call on the line, or if the operator should insert one of the plugs of the cord circuit 39 in one of the multiple jacks associated with the line, it would be desirable and necessary to disconnect the testing apparatus from the line at once in order to cause no interference with the call. Accordingly the relay 21 and the signal lamp 23 are provided in the testing apparatus and are associated with the relay transferring key $K_6$. When the key $K_6$ is in its normal position a winding of relay 21 is associated with the ring conductor of plug $P_4$. It is pointed out that in an ordinary subscriber's line of the type illustrated by the line $L_1$, battery associated with the line relay is applied to the ring conductor of the line. Accordingly when a message register on a line, such as $L_1$ is being tested, the key $K_6$ is allowed to remain in its normal position and the right hand winding of relay 21 will normally be included in the following circuit: from ground and battery, winding of relay 59, ring contacts of jack $J_2$ and plug $P_2$, conductors 49, 64, 65, right hand winding of relay 21, conductor 66, ring conductor 67, ring contacts of plug $P_4$ and jack $J_5$, ring conductor of line $L_1$, winding of line relay 30, to battery and ground. From conductor 64 through resistance R circuits may be traced leading to 39 volt battery and to ground. The resistance of relay 59 however is low compared to the resistance of other apparatus involved and consequently the potential of conductor 64 is substantially the same as the 24 volt battery potential. Therefore, as battery is found at the other end of the circuit traced in the foregoing, namely at the lower winding of relay 30, neither relay 30 nor relay 21 will operate. However, if the subscriber attempts to make a call and removes the receiver from the hook at substation 37, a circuit will be completed as follows: from ring contacts of plug $P_4$ and jack $J_5$, ring conductor of line $L_1$, through substation apparatus 37, tip conductor of line $L_1$, winding of line relay 30 to ground. The closing of this circuit will operate the relay 21 which in turn will close a circuit for the signal lamp 23 and will operate the lamp. The operation of lamp 23 will inform the testman that it is desirable to disconnect the testing set from the line $L_1$. If an operator should insert the calling plug, such as the calling plug $P_6$ of the cord circuit 39, into one of the multiple jacks, such as jack $J_4$, while the line $L_1$ is being tested, and should the operator then attempt to ring on such a line by operating either the ringing key $K_{13}$ or the ringing key $K_{14}$, the relay 21 will be operated by ringing current if the operator is ringing over the ring side of the line as in the case of key $K_{13}$, or would be operated by ground applied to the ring conductor of the line if the operator was ringing over the tip side of the line as in the case of key $K_{14}$.

If it is desired to test message register apparatus such as message register 32 associated with a line, such as the line $L_2$ with which is associated prepayment coin box apparatus 35, the testing operation will be substantially the same as has been described with respect to the line $L_1$, except that the key $K_6$ will be operated and the winding of relay 21 connected to the tip conductor of plug $P_4$. This is because in the type of line illustrated by the line $L_2$, battery associated with the line relay is applied to the tip conductor of the line, rather than to the ring conductor of the line as in the case of line $L_1$. Accordingly, when the key $K_6$ has been operated, the winding of relay 21 will be included in the following circuit: from ground and battery, winding of relay 59, ring contacts of jack $J_2$ and plug $P_2$, conductors 49, 64, 65, winding of relay 21, conductor 66, make contacts of key $K_6$, conductor 68, tip contacts of plug $P_4$ and jack $J_7$, tip conductor of line $L_2$, winding of relay 33 to battery and ground. As substantially 24 volts is to be found at both ends of this circuit, the relay 21 will not be operated. However, if an attempt is made to make a call at substation 36 and a coin is dropped in the prepayment coin box apparatus, ground will be applied to the tip conductor of plug $P_4$ as follows: from tip conductor of plug $P_4$, tip contacts of plug $P_4$ and jack $J_7$, tip conductor of line $L_2$, contact 69, coin box apparatus 35 to ground. This will operate the relay 21 which in turn will operate the signal lamp 23 and notify the testman that it is desirable to disconnect the testing apparatus from the line $L_2$. If the operator should attempt to insert the answering plug $P_5$ of cord circuit 39 into one of the multiple jacks, such as jack $J_6$ on line $L_2$ while the message register apparatus on the line is being tested, ground would be applied to the tip conductor of plug $P_4$ and the relay 21 as follows: from ground 70, tip conductor of cord 39, tip contacts of plug $P_5$ and jack $J_6$, tip conductor of line $L_2$, tip contacts of jack $J_7$ and plug $P_4$ to the tip conductor of plug $P_4$. This will operate the relay 21 which in turn will operate the signal lamp 23 and inform the testman that it is desirable to disconnect the testing apparatus from the line.

If it is desired to test a message register, such as register 29, for a single operation, and more particularly to determine whether the register is operating on the proper amount of current, the plugs $P_1$ and $P_2$ will be inserted in jacks $J_1$ and $J_2$, and the plug $P_4$ will be inserted in the jack $J_5$ but the key $K_1$ will not be operated. The keys $K_8$ and $K_9$, however, will be operated. As has been formerly pointed out, when an answering cord of an operator's cord circuit, such as cord circuit 39, is associated with a subscriber's line, the 24-volt battery normally applied to the sleeve circuit of such a cord is not sufficient to cause the operation of message register apparatus associated with the line. However, when the message register key of the cord circuit is operated, a 39-volt battery is applied to the sleeve circuit of the cord and the additional current is sufficient to cause the operation of the message register apparatus. When the message register key is released and the 39-volt battery disconnected from the sleeve circuit, the 24-volt battery suffices to hold the message register apparatus in an energized condition. This arrangement is provided so that the message register apparatus will operate but once for one call, even though the message register key should be operated more than once. Accordingly when both keys $K_8$ and $K_9$ are operated, 24-volt battery and 39-volt battery will be applied to the sleeve circuit of plug $P_4$ and to the message register apparatus. When the key $K_9$ is released, the 39-volt battery will be disconnected from the sleeve circuit of plug $P_4$ and the register apparatus. If the register apparatus is operating properly, it should operate when both the keys $K_8$ and $K_9$ are thrown and should remain in an operated condition when the key $K_9$ is released and the key $K_8$ left in an operated position. When the key $K_8$ is operated, 24-volt battery is applied to the sleeve circuit of plug $P_4$ and the message register apparatus over the following circuit: from ground and battery, winding of relay 59, ring contacts of jack $J_2$ and plug $P_2$, conductor 49, resistance R, conductor 51, ammeter 28, conductor 52, lower normal contact of key $K_{10}$, conductor 53, lower make contact of key $K_8$, conductor 56, sleeve contacts of plug $P_4$, and jack $J_5$, conductor 57, winding of message register apparatus 29 to ground. Upon the operation of key $K_9$ in conjunction with the operation of key $K_8$, 39-volt battery will be applied to the sleeve circuit of plug $P_4$ and to the message register apparatus over the following circuit: from source 48, armature and contact of relay 59, conductor 58, contact of jack $J_1$ and plug $P_1$, conductor 60, conductor 71, conductor 72, lower make contact of key $K_9$, conductor 73, conductors 63 and 51, ammeter 28, conductor 52, lower normal contact of key $K_{10}$, conductor 53, lower make contact of key $K_8$, conductor 56, sleeve contacts of plug $P_4$ and jack $J_5$, conductor 57, winding of message register apparatus 29, to ground. By means of the ammeter 28 which is included in the above traced circuits it may be determined whether the message registers are operating on the proper currents.

It is not considered desirable for maintenance reasons to connect the 39 volt battery to jack $J_1$ except during a test. To accomplish this the connection between 39 volt battery and jack $J_1$ is controlled by relay 59 which, as previously pointed out, operates when one of the contacts 15 or 16 is closed following the operation of start key $K_1$ of relay 59 operates upon the closure of key $K_8$ or key $K_{10}$, in either case the set being connected to a subscriber's line for test. Before the contact of relay 59 closes, the operating current for the relay flows from 24 volt battery through the winding of the relay to ground over a circuit previously traced. After the contact is closed however operating current for the relay flows from 39 volt battery, the contact of relay 59, springs of jack $J_1$, contacts of plug $P_1$ conductor 60, conductor 61, upper break contact of key $K_{10}$, conductor 62, upper break contact of key $K_8$, conductor 63, point 50, resistance R, conductor 49, ring contact of plug $P_2$, ring spring of jack $J_2$, winding of relay 59, 24 volt battery, to ground. From point 50 there is a shunt path through the ammeter 28 to ground over a circuit previously traced. Thus when the contact of relay 59 makes current in its winding is reversed and consequently a slow release relay is employed to guard against the relay kicking off. After relay 59 has operated it is locked up over the circuit last traced and remains locked up during test and until one of the plugs $P_1$ or $P_2$ is disconnected.

While the invention has been disclosed in certain specific arrangements which have been deemed desirable, it is understood that it is capable of embodiment in many and widely varied forms without departing from the spirit of the invention as defined in the appended claims.

What is claimed is:

1. A subscriber's telephone line terminating at a jack at a swithboard, message register apparatus associated with said line at said switchboard, apparatus for testing said message register, means for connecting said esting apparatus directly with the jack of said subscriber's line, said testing apparatus including means for completing a circuit for said message register and means for interrupting said circuit a desired number of times, said interrupting device comprising an electro-magnet, an armature, a pawl attached to said armature, a ratchet wheel operated by said pawl, a plurality of cams controlled by said ratchet wheel, and a plurality of spring contacts controlled by said cams, said spring contacts controlling the duration of operation of said interrupting device and controlling said circuit for said message register.

2. A plurality of telephone lines terminating at jacks at a switchboard, message registers associated with said lines at said switchboard, apparatus for testing a plurality of said message registers at the same time, means for connecting said testing apparatus directly with each of the jacks at said subscriber's lines, said testing apparatus including means for completing circuits for said message registers and means for interrupting said circuits a desired number of times, said interrupting device comprising an electromagnet, an armature, a pawl attached to said armature, a ratchet wheel operated by said pawl, a plurality of cams controlled by said ratchet wheel, and a plurality of spring contacts controlled by said cams, said spring contacts controlling the duration of operation of said interrupting device and controlling said circuits for said message registers.

3. A telephone switchboard, a subscriber's telephone line terminating in a jack thereat, message register apparatus for said line, apparatus for testing said message register, means for connecting said testing apparatus directly with said jack, said testing apparatus including means for completing a circuit for said message register and means for interrupting said circuit a desired number of times, said interrupting device comprising an electro-magnet, an armature, a pawl attached to said armature, a rachet wheel operated by said pawl, a plurality of cams controlled by said ratchet wheel, a plurality of spring contacts controlled by said cams, said spring contacts controlling the duration of operation of said interrupting device and controlling said circuit for said message register, a second interrupter and a source of current at said switchboard, said interrupter operating continuously, and means for operating said first interrupter by current transmitted from said source through said second interrupter.

4. A substation telephone line, a message register associated with said line, a substation including coin box apparatus associated with said line, apparatus for testing said message register, and indicating means in said testing apparatus responding when said coin box apparatus is operated.

5. A subscriber's telephone line, a substation and message register apparatus associated with said line, a second subscriber's telephone line, message register apparatus and a substation including coin box apparatus associated with said line, a link circuit adapted for establishing connections with said lines, apparatus for testing said message registers, indicating means in said testing apparatus, and switching means controlling said indicating means whereby said indicating means will operate when the talking circuit of said first mentioned line is completed at the substation associated therewith, or when the coin box apparatus associated with said second mentioned line is operated, or when a connection is established with one of said lines by said link circuit.

In testimony whereof, I have signed my name to this specification this 25th day of June 1919.

WILLIAM A. RHODES.